(12) United States Patent
Lu

(10) Patent No.: US 11,669,148 B2
(45) Date of Patent: Jun. 6, 2023

(54) METHOD FOR SUPPLYING BLOCKCHAIN COMPUTING POWER AND SYSTEM THEREOF

(71) Applicant: Liang Lu, Shanghai (CN)

(72) Inventor: Liang Lu, Shanghai (CN)

( * ) Notice: Subject to any disclaimer, the term of this patent is extended or adjusted under 35 U.S.C. 154(b) by 0 days.

(21) Appl. No.: 17/578,297

(22) Filed: Jan. 18, 2022

(65) Prior Publication Data

US 2023/0139432 A1 May 4, 2023

(30) Foreign Application Priority Data

Nov. 4, 2021 (CN) .......................... 202111300459X

(51) Int. Cl.

| G06F 1/00 | (2006.01) |
|---|---|
| G06F 1/3246 | (2019.01) |
| G06Q 30/0601 | (2023.01) |
| G06F 1/3203 | (2019.01) |

(52) U.S. Cl.
CPC ....... G06F 1/3246 (2013.01); G06Q 30/0635 (2013.01); G06F 1/3203 (2013.01)

(58) Field of Classification Search
CPC ............................ G06F 1/3246; G06Q 30/0635
USPC .......................................................... 713/324
See application file for complete search history.

(56) References Cited

U.S. PATENT DOCUMENTS

| 10,444,818 B1 * | 10/2019 | McNamara | G06F 1/3296 |
|---|---|---|---|
| 10,983,958 B1 * | 4/2021 | Miller | H02J 3/381 |
| 11,411,402 B1 * | 8/2022 | Singh | G06Q 30/0207 |
| 2019/0013669 A1 * | 1/2019 | Davies | H04L 67/1042 |
| 2019/0087920 A1 * | 3/2019 | Cui | G06Q 20/3829 |
| 2019/0312440 A1 * | 10/2019 | Pignier | H02J 3/46 |
| 2020/0161858 A1 * | 5/2020 | Wang | H02J 3/06 |
| 2020/0175615 A1 * | 6/2020 | Kozakura | G06Q 50/06 |
| 2020/0274389 A1 * | 8/2020 | Islam | G06Q 50/06 |
| 2021/0065317 A1 * | 3/2021 | Cali | G06Q 50/18 |
| 2021/0098988 A1 * | 4/2021 | Gokhale | G06Q 50/06 |
| 2021/0304307 A1 * | 9/2021 | Ding | G06Q 50/06 |
| 2022/0012806 A1 * | 1/2022 | Xu | G06Q 50/06 |
| 2022/0145730 A1 * | 5/2022 | Benson | H02J 7/00306 |

(Continued)

*Primary Examiner* — Volvick Derose
(74) *Attorney, Agent, or Firm* — Chun-Ming Shih; Lanway IPR Services

(57) ABSTRACT

The present disclosure relates to a method for supplying blockchain computing power and a system thereof. The method comprises the steps of: receiving a computing power purchase request sent by a user-side terminal; generating purchase result data according to the computing power purchase request; scheduling a first blockchain server to provide users with computing service according to the purchase result data; when the first blockchain server stops serving, starting timing to obtain the target duration; judging whether the first blockchain server restarts the service when the target duration is less than the preset duration threshold, and obtaining a preset result; when the preset result is YES, improving the computing power of the first blockchain server correspondingly, so that the total service duration of the user and the actually obtained total computing power remain unchanged; when the preset result is NO, scheduling a second blockchain server to provide users with computing service. The present disclosure enables the user to obtain stable computing power.

8 Claims, 2 Drawing Sheets

(56) References Cited

U.S. PATENT DOCUMENTS

2022/0247174 A1* 8/2022 Miller .................... H02J 3/004
2022/0366494 A1* 11/2022 Celia .................... G06N 20/20

* cited by examiner

METHOD FOR SUPPLYING BLOCKCHAIN COMPUTING POWER AND SYSTEM THEREOF

TECHNICAL FIELD

The present disclosure relates to the technical field of blockchain computing power supply, in particular to a method for supplying blockchain computing power and a system thereof.

BACKGROUND

Blockchain computing power is the computing power of a blockchain server. At present, due to the high price of a blockchain server, users often rent a blockchain server to obtain blockchain computing power. At present, when the blockchain server fails, the blockchain server cannot provide users with blockchain computing power. The blockchain server can only continue to provide users with computing power after the blockchain server is repaired, so that the computing power obtained by users is unstable.

SUMMARY

In view of this, the present disclosure provides a method for supplying blockchain computing power and a system thereof to solve the problems in related technologies that the computing power obtained by users is unstable and the period when users obtain computing power is prolonged.

The present disclosure uses the following technical scheme.

In a first aspect, the present disclosure provides a method for supplying blockchain computing power, comprising:

receiving a computing power purchase request sent by a user-side terminal;

generating purchase result data according to the computing power purchase request;

scheduling a first blockchain server to provide users with computing service according to the purchase result data, wherein the number of the first blockchain servers is determined according to the computing power purchased by the user, when one blockchain server is capable of meeting the computing power requirements of the user, the number of the first blockchain servers is one, otherwise, the number of the first blockchain servers is at least two;

when the first blockchain server stops serving, starting timing to obtain the target duration;

judging whether the first blockchain server restarts the service when the target duration is less than the preset duration threshold, and obtaining a preset result;

when the preset result is YES, improving the computing power of the first blockchain server correspondingly, so that the total service duration of the user and the actually obtained total computing power remain unchanged;

when the preset result is NO, scheduling a second blockchain server to provide users with computing service, wherein the number of the second blockchain servers is the same as that of the first blockchain servers.

Preferably, the computing power of the first blockchain server is the same as that of the second blockchain server.

Preferably, improving the computing power of the first blockchain server correspondingly, so that the total service duration of the user and the actually obtained total computing power remain unchanged, comprises:

determining the duration that the first blockchain server stops serving;

determining the interrupted computing power of the first blockchain server according to the duration that the first blockchain server stops serving and the standard computing power of the first blockchain server;

determining the excess operation duration and the excess computing power of the first blockchain server according to the interrupted computing power of the first blockchain server and the duration that the first blockchain server stops serving;

controlling the first blockchain server to run the excess operation duration in the state that the output computing power is the excess computing power, and continuing to run in the state that the output computing power is the standard computing power, so that the total service duration of the user and the actually obtained total computing power remain unchanged.

Preferably, the calculation formula of the excess computing power is as follows:

excess computing power=3*standard computing power the calculation formula of the excess operation duration is as follows:

excess operation duration=½*the duration that the first blockchain server stops serving.

Preferably, after generating purchase result data according to the computing power purchase request, the method further comprises:

feeding back purchase result data to the user-side terminal, wherein the purchase result data comprises purchase success notification information.

Preferably, scheduling a first blockchain server to provide users with computing service according to the purchase result data comprises:

determining a first blockchain server among a plurality of preset blockchain servers;

establishing a first connection relationship between the first blockchain server and a preset blockchain calculation and distribution center agent node;

issuing a workload certification task to the first blockchain server based on the first connection relationship, so as to schedule the first blockchain server to provide users with computing service;

correspondingly, scheduling the second blockchain server to provide users with computing service comprises:

determining a second blockchain server among the remaining preset blockchain servers;

establishing a second connection relationship between the second blockchain server and the preset blockchain calculation and distribution center agent node;

issuing a workload certification task to the second blockchain server based on the second connection relationship, so as to schedule the second blockchain server to provide users with computing service.

In a second aspect, the present disclosure further provides a system for supplying blockchain computing power, comprising:

a user-side terminal interacting module, which is configured to receive a computing power purchase request sent by a user-side terminal;

a user-side terminal data processing module, which is configured to generate purchase result data according to the computing power purchase request;

a scheduling module, which is configured to schedule a first blockchain server to provide users with computing service according to the purchase result data, wherein the number of the first blockchain servers is determined according to the computing power purchased by the user, when one blockchain server is capable of meeting the computing power requirements of the user, the number of the first blockchain servers is one, otherwise, the number of the first blockchain servers is at least two;

a timing module, which is configured to, when the first blockchain server stops serving, start timing to obtain the target duration;

a judging module, which is configured to judge whether the first blockchain server restarts the service when the target duration is less than the preset duration threshold, and obtain a preset result;

a computing power compensating module, which is configured to, when the preset result is YES, improve the computing power of the first blockchain server correspondingly, so that the total service duration of the user and the actually obtained total computing power remain unchanged;

a computing power drifting module, which is configured to, when the preset result is NO, schedule a second blockchain server to provide users with computing service, wherein the number of the second blockchain servers is the same as that of the first blockchain servers.

Preferably, the system for supplying blockchain computing power according to the present disclosure further comprises a user-side terminal;

wherein the user-side terminal is configured to send the computing power purchase request to the user-side terminal interacting module.

The present disclosure uses the above technical scheme. A method for supplying blockchain computing power comprises the steps of: receiving a computing power purchase request sent by a user-side terminal; generating purchase result data according to the computing power purchase request; scheduling a first blockchain server to provide users with computing service according to the purchase result data; when the first blockchain server stops serving, starting timing to obtain the target duration; judging whether the first blockchain server restarts the service when the target duration is less than the preset duration threshold, and obtaining a preset result; when the preset result is YES, improving the computing power of the first blockchain server correspondingly, so that the total service duration of the user and the actually obtained total computing power remain unchanged; when the preset result is NO, scheduling a second blockchain server to provide users with computing service. Based on this, when the blockchain server stops serving, when the blockchain server stops serving for a short time, the output computing power of the blockchain server is improved to compensate for the interrupted computing power, and when the blockchain server stops serving for a long time, other blockchain servers are scheduled to replace the original servers, so as to avoid the situation that users cannot obtain computing power for a long time. Finally, users can obtain stable computing power.

BRIEF DESCRIPTION OF THE DRAWINGS

In order to more clearly explain the embodiments of the present disclosure or the technical scheme in the prior art, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without making creative efforts.

DETAILED DESCRIPTION OF THE EMBODIMENTS

In order to make the purpose, technical scheme and advantages of the present disclosure clearer, the technical scheme of the present disclosure will be described in detail hereinafter. Obviously, the described embodiments are only some of the embodiments of the present disclosure, rather than all of the embodiments. Based on the embodiments in the present disclosure, all other embodiments obtained by those skilled in the art without making creative efforts belong to the scope of protection of the present disclosure.

Figure 1:
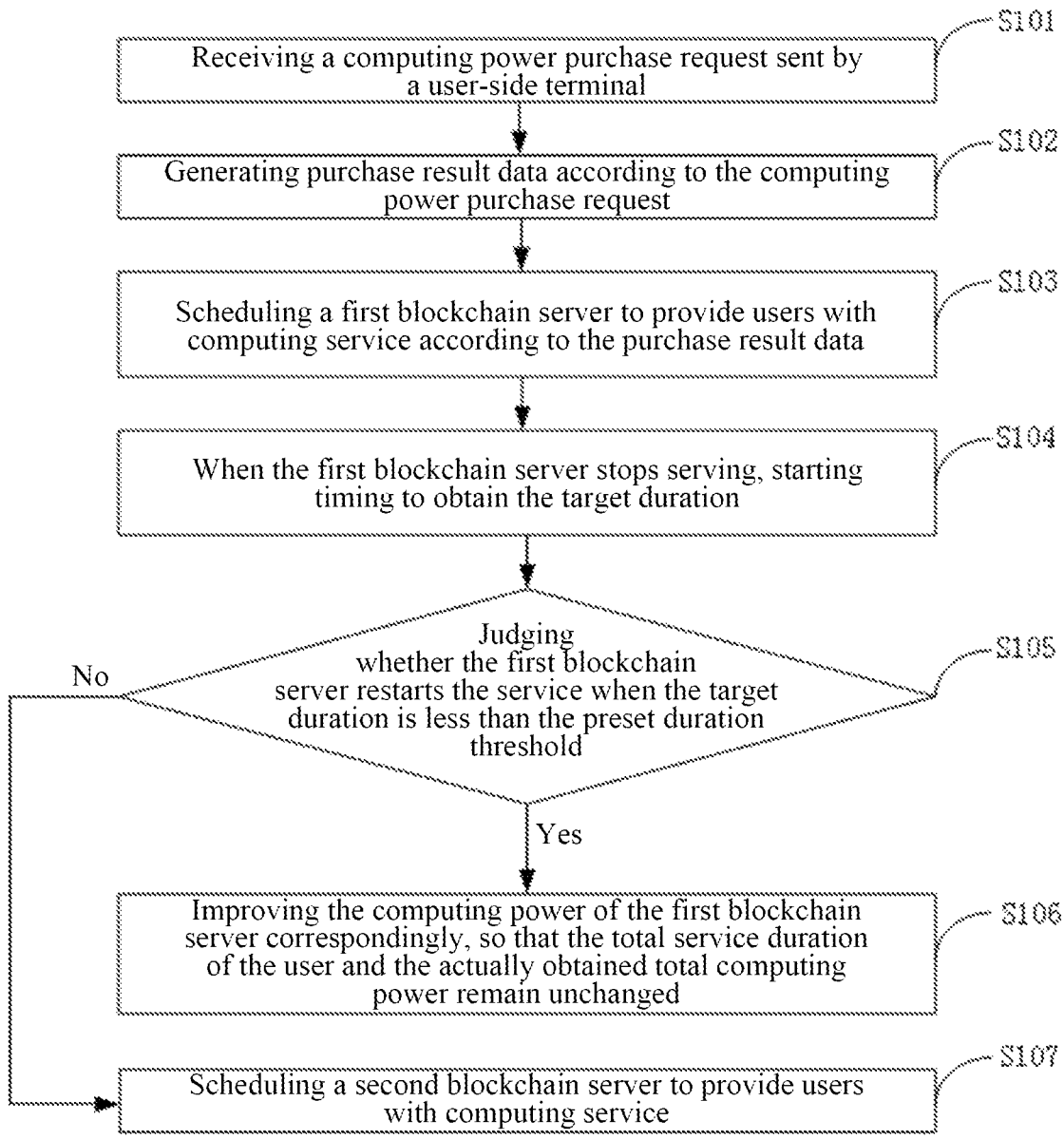
FIG. 1 is a flow diagram of a method for supplying blockchain computing power according to an embodiment of the present disclosure.

FIG. 1 is a flow diagram of a method for supplying blockchain computing power according to an embodiment of the present disclosure. As shown in FIG. 1, the method for supplying blockchain computing power according to this embodiment comprises:

S101, receiving a computing power purchase request sent by a user-side terminal;

S102, generating purchase result data according to the computing power purchase request;

S103, scheduling a first blockchain server to provide users with computing service according to the purchase result data, wherein the number of the first blockchain servers is determined according to the computing power purchased by the user, when one blockchain server is capable of meeting the computing power requirements of the user, the number of the first blockchain servers is one, otherwise, the number of the first blockchain servers is at least two;

S104, when the first blockchain server stops serving, starting timing to obtain the target duration;

S105, judging whether the first blockchain server restarts the service when the target duration is less than the preset duration threshold, and obtaining a preset result; when the preset result is YES, executing step S106; otherwise, executing step S107;

S106, improving the computing power of the first blockchain server correspondingly, so that the total service duration of the user and the actually obtained total computing power remain unchanged;

S107, when the preset result is NO, scheduling a second blockchain server to provide users with computing service, wherein the number of the second blockchain servers is the same as that of the first blockchain servers.

Specifically, when users purchase more computing power, one blockchain server cannot satisfy users. At this time, a plurality of blockchain servers are defined to provide users with computing power. When users purchase less computing power, one blockchain server can satisfy users. At this time, a blockchain server is defined to provide users with computing power.

The purchase result data comprises purchase contract data. When there is a power outage or the first blockchain server fails, the first blockchain server stops serving users. The preset duration threshold can be freely set by users according to actual needs. When the duration that the first blockchain server stops serving is less than or equal to the preset duration threshold, that is, the first blockchain server only stops serving for a short time. In this case, the method of improving the computing power of the first blockchain server and making the total service duration of users and the actually obtained total computing power remain unchanged is used. When the duration that the first blockchain server stops serving is greater than the preset duration threshold, that is, the first blockchain server has not recovered the service state for a long time. In this case, the method of scheduling other blockchain servers to replace the original first blockchain server is used. In this way, it not only ensures that users can obtain stable computing power, but also meets the purpose that users can flexibly adjust the method of providing computing power according to the fault situation of the blockchain server.

This embodiment uses the above technical scheme. A method for supplying blockchain computing power comprises the steps of: receiving a computing power purchase request sent by a user-side terminal; generating purchase result data according to the computing power purchase request; scheduling a first blockchain server to provide users with computing service according to the purchase result data; when the first blockchain server stops serving, starting timing to obtain the target duration; judging whether the first blockchain server restarts the service when the target duration is less than the preset duration threshold, and obtaining a preset result; when the preset result is YES, improving the computing power of the first blockchain server correspondingly, so that the total service duration of the user and the actually obtained total computing power remain unchanged; when the preset result is NO, scheduling a second blockchain server to provide users with computing service. Based on this, when the blockchain server stops serving, when the blockchain server stops serving for a short time, the output computing power of the blockchain server is improved to compensate for the interrupted computing power, and when the blockchain server stops serving for a long time, other blockchain servers are scheduled to replace the original servers, so as to avoid the situation that users cannot obtain computing power for a long time. Finally, users can obtain stable computing power.

Preferably, the computing power of the first blockchain server is the same as that of the second blockchain server. In this way, the stability of computing power acquired by users is further ensured.

Preferably, improving the computing power of the first blockchain server correspondingly, so that the total service duration of the user and the actually obtained total computing power remain unchanged, comprises:

determining the duration that the first blockchain server stops serving;

determining the interrupted computing power of the first blockchain server according to the duration that the first blockchain server stops serving and the standard computing power of the first blockchain server;

determining the excess operation duration and the excess computing power of the first blockchain server according to the interrupted computing power of the first blockchain server and the duration that the first blockchain server stops serving;

controlling the first blockchain server to run the excess operation duration in the state that the output computing power is the excess computing power, and continuing to run in the state that the output computing power is the standard computing power, so that the total service duration of the user and the actually obtained total computing power remain unchanged.

In a specific example, if the first blockchain server stops serving for S and the standard computing power of the first blockchain server is T, the interrupted computing power is S*T. In order to compensate for the interrupted computing power in a short time, the excess operation duration of the first blockchain server is ½*the duration that the first blockchain server stops serving, so that the excess computing power of the first blockchain server is 3*the standard computing power, that is, the calculation formula of the excess computing power is as follows:

excess computing power=3*standard computing power the calculation formula of the excess operation duration is as follows:

excess operation duration=½*the duration that the first blockchain server stops serving.

Preferably, after generating purchase result data according to the computing power purchase request, the method for supplying blockchain computing power according to this embodiment further comprises:

feeding back purchase result data to the user-side terminal, wherein the purchase result data comprises purchase success notification information. In this way, it is convenient for the user to know the purchase result through the information displayed by the user-side terminal.

Preferably, scheduling a first blockchain server to provide users with computing service according to the purchase result data comprises:

determining a first blockchain server among a plurality of preset blockchain servers;

establishing a first connection relationship between the first blockchain server and a preset blockchain calculation and distribution center agent node;

issuing a workload certification task to the first blockchain server based on the first connection relationship, so as to schedule the first blockchain server to provide users with computing service;

correspondingly, scheduling the second blockchain server to provide users with computing service comprises:

determining a second blockchain server among the remaining preset blockchain servers;

establishing a second connection relationship between the second blockchain server and the preset blockchain calculation and distribution center agent node;

issuing a workload certification task to the second blockchain server based on the second connection relationship, so as to schedule the second blockchain server to provide users with computing service.

Specifically, the number of preset blockchain servers can be two or more. After determining the purchase result data, the preset scheduling center first determines the first blockchain server among a plurality of preset blockchain servers, and then establishes TCP long connection between the first blockchain server and the preset blockchain calculation and distribution center agent node, that is, the first connection relationship. Subsequently, the blockchain calculation and distribution center issues a workload certification task to the preset blockchain calculation and distribution center agent node through the first connection relationship. The preset blockchain calculation and distribution center agent node distributes workload certification subtasks to the first blockchain server according to the workload certification task, so as to schedule the first blockchain server to provide users with computing service. The process of scheduling the second blockchain server to provide users with computing service is the same.

Figure 2:
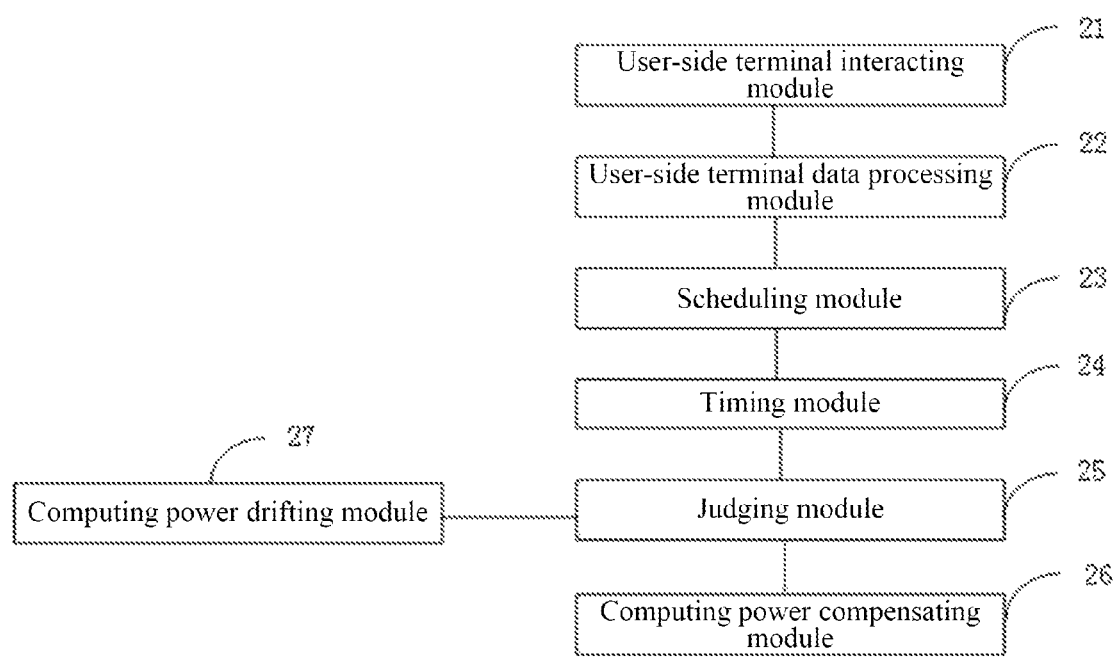
FIG. 2 is a schematic structural diagram of a system for supplying blockchain computing power according to an embodiment of the present disclosure.

Based on a general inventive concept, the present disclosure further provides a system for supplying blockchain computing power. FIG. 2 is a schematic structural diagram of a system for supplying blockchain computing power according to an embodiment of the present disclosure. The system for supplying blockchain computing power of this embodiment is used to realize the method for supplying blockchain computing power of the above embodiment. As shown in FIG. 2, the system for supplying blockchain computing power of this embodiment comprises: a user-side terminal interacting module 21, a user-side terminal data processing module 22, a scheduling module 23, a timing module 24, a judging module 25, a computing power compensating module 26 and a computing power drifting module 27.

The user-side terminal interacting module 21 is configured to receive a computing power purchase request sent by a user-side terminal; the user-side terminal data processing module 22 is configured to generate purchase result data according to the computing power purchase request; the scheduling module 23 is configured to schedule a first blockchain server to provide users with computing service according to the purchase result data, wherein the number of the first blockchain servers is determined according to the computing power purchased by the user, when one blockchain server is capable of meeting the computing power requirements of the user, the number of the first blockchain servers is one, otherwise, the number of the first blockchain servers is at least two; the timing module 24 is configured to, when the first blockchain server stops serving, start timing to obtain the target duration; the judging module 25 is configured to judge whether the first blockchain server restarts the service when the target duration is less than the preset duration threshold, and obtain a preset result; the computing power compensating module 26 is configured to, when the preset result is YES, improve the computing power of the first blockchain server correspondingly, so that the total service duration of the user and the actually obtained total computing power remain unchanged; the computing power drifting module 27 is configured to, when the preset result is NO, schedule a second blockchain server to provide users with computing service, wherein the number of the second blockchain servers is the same as that of the first blockchain servers.

The computing power of the first blockchain server is the same as that of the second blockchain server.

Preferably, the computing power compensating module 26 is specifically configured to implement the following methods:

determining the duration that the first blockchain server stops serving;

determining the interrupted computing power of the first blockchain server according to the duration that the first blockchain server stops serving and the standard computing power of the first blockchain server;

determining the excess operation duration and the excess computing power of the first blockchain server according to the interrupted computing power of the first blockchain server and the duration that the first blockchain server stops serving;

controlling the first blockchain server to run the excess operation duration in the state that the output computing power is the excess computing power, and continuing to run in the state that the output computing power is the standard computing power, so that the total service duration of the user and the actually obtained total computing power remain unchanged.

The calculation formula of the excess computing power is as follows:

excess computing power=3*standard computing power

The calculation formula of the excess operation duration is as follows:

excess operation duration=½*the duration that the first blockchain server stops serving.

Preferably, the method for supplying blockchain computing power of this embodiment further comprises: a notification module, which is configured to feed back purchase result data to the user-side terminal, wherein the purchase result data comprises purchase success notification information.

Preferably, the scheduling module 23 is specifically configured to implement the following methods:

determining a first blockchain server among a plurality of preset blockchain servers;

establishing a first connection relationship between the first blockchain server and a preset blockchain calculation and distribution center agent node;

issuing a workload certification task to the first blockchain server based on the first connection relationship, so as to schedule the first blockchain server to provide users with computing service;

and the scheduling module is configured to implement the following methods:

determining a second blockchain server among the remaining preset blockchain servers;

establishing a second connection relationship between the second blockchain server and the preset blockchain calculation and distribution center agent node;

issuing a workload certification task to the second blockchain server based on the second connection relationship, so as to schedule the second blockchain server to provide users with computing service.

Preferably, the system for supplying blockchain computing power of this embodiment further comprises a user-side terminal;

wherein the user-side terminal is configured to send the computing power purchase request to the user-side terminal interacting module.

It should be noted that the system for supplying blockchain computing power of this embodiment and the method for supplying blockchain computing power of the above embodiment are based on a general inventive concept, and have the same or corresponding execution process and beneficial effects, which will not be described in detail here.

It can be understood that the same or similar parts in the above embodiments can refer to each other, and the contents that are not explained in detail in some embodiments can refer to the same or similar contents in other embodiments.

It should be noted that in the description of the present disclosure, the terms "first" and "second" are only used for descriptive purposes, and cannot be understood as indicating or implying relative importance. In addition, in the description of the present disclosure, unless otherwise stated, "a plurality of" means at least two.

Any description of the process or method in the flowchart or described in other ways herein can be understood as representing a module, a segment or a part of the code including one or more executable instructions for realizing the step of specific logical functions or processes. Moreover, the scope of the preferred embodiments of the present disclosure comprises other implementations, in which the functions can be executed out of the order shown or discussed, including in a substantially simultaneous manner or in the reverse order according to the functions involved, which should be understood by those skilled in the art to which the embodiments of the present disclosure belong.

It should be understood that various parts of the present disclosure can be implemented by hardware, software, firmware or the combination thereof. In the above embodiments, a plurality of steps or methods can be realized by software or firmware stored in memory and executed by a suitable instruction execution system. For example, if it is implemented by hardware, as in another embodiment, it can be implemented by any one or a combination of the following technologies known in the art: a discrete logic circuit with a logic gate circuit for realizing logic functions on data signals, an application specific integrated circuit with an appropriate combining logic gate circuit, a programmable gate array (PGA), a field programmable gate array (FPGA), etc.

It can be understood by those skilled in the art that all or part of the steps carried by the method for implementing the above embodiments can be completed by instructing related hardware through a program. The program can be stored in a computer-readable storage medium, and the program, when executed, comprises one or a combination of the steps of the method embodiments.

In addition, each functional unit in each embodiment of the present disclosure can be integrated in one processing module. Each unit can exist physically alone, or two or more units can be integrated in one module. The above integrated modules can be implemented in the form of hardware or software functional modules. The integrated module can also be stored in a computer-readable storage medium if it is realized in the form of a software functional module and sold or used as an independent product.

The storage medium mentioned above can be a read-only memory, a magnetic disk or an optical disk, etc.

In the description of this specification, the reference to the description of the terms "one embodiment", "some embodiments", "examples", "specific examples" or "some examples" means that the specific features, structures, materials or characteristics described in conjunction with this embodiment or example are included in at least one embodiment or example of the present disclosure. In this specification, the schematic expressions of the above terms do not necessarily refer to the same embodiments or examples. Furthermore, the specific features, structures, materials or characteristics described may be combined in any one or more embodiments or examples in a suitable manner.

Although the embodiments of the present disclosure have been shown and described above, it can be understood that the above embodiments are exemplary and should not be construed as limitations of the present disclosure. Those skilled in the art can make changes, modifications, substitutions and variations to the above embodiments within the scope of the present disclosure.

What is claimed is:

1. A method for supplying blockchain computing power, comprising:
receiving a computing power purchase request sent by a user-side terminal;
generating purchase result data according to the computing power purchase request;
scheduling a first blockchain server to provide users with computing service according to the purchase result data, wherein the number of the first blockchain servers is determined according to the computing power purchased by the user, when one blockchain server is capable of meeting the computing power requirements of the user, the number of the first blockchain servers is one, otherwise, the number of the first blockchain servers is at least two;
when the first blockchain server stops serving, starting timing to obtain the target duration;
judging whether the first blockchain server restarts the service when the target duration is less than the preset duration threshold, and obtaining a preset result;
when the preset result is YES, improving the computing power of the first blockchain server correspondingly, so that the total service duration of the user and the actually obtained total computing power remain unchanged;
when the preset result is NO, scheduling a second blockchain server to provide users with computing service, wherein the number of the second blockchain servers is the same as that of the first blockchain servers.

2. The method for supplying blockchain computing power according to claim 1, wherein the computing power of the first blockchain server is the same as that of the second blockchain server.

3. The method for supplying blockchain computing power according to claim 1, wherein improving the computing power of the first blockchain server correspondingly, so that the total service duration of the user and the actually obtained total computing power remain unchanged, comprises:
determining the duration that the first blockchain server stops serving;
determining the interrupted computing power of the first blockchain server according to the duration that the first blockchain server stops serving and the standard computing power of the first blockchain server;
determining the excess operation duration and the excess computing power of the first blockchain server according to the interrupted computing power of the first blockchain server and the duration that the first blockchain server stops serving;
controlling the first blockchain server to run the excess operation duration in the state that the output computing power is the excess computing power, and continuing to run in the state that the output computing power is the standard computing power, so that the total service duration of the user and the actually obtained total computing power remain unchanged.

4. The method for supplying blockchain computing power according to claim 3, wherein the calculation formula of the excess computing power is as follows:
excess computing power=3*standard computing power
the calculation formula of the excess operation duration is as follows:
excess operation duration=½*the duration that the first blockchain server stops serving.

5. The method for supplying blockchain computing power according to claim 1, wherein after generating purchase result data according to the computing power purchase request, the method further comprises:
feeding back purchase result data to the user-side terminal, wherein the purchase result data comprises purchase success notification information.

6. The method for supplying blockchain computing power according to claim 1, wherein scheduling a first blockchain server to provide users with computing service according to the purchase result data comprises:
determining a first blockchain server among a plurality of preset blockchain servers;
establishing a first connection relationship between the first blockchain server and a preset blockchain calculation and distribution center agent node;
issuing a workload certification task to the first blockchain server based on the first connection relationship, so as to schedule the first blockchain server to provide users with computing service;
correspondingly, scheduling the second blockchain server to provide users with computing service comprises:

determining a second blockchain server among the remaining preset blockchain servers;

establishing a second connection relationship between the second blockchain server and the preset blockchain calculation and distribution center agent node;

issuing a workload certification task to the second blockchain server based on the second connection relationship, so as to schedule the second blockchain server to provide users with computing service.

7. A system for supplying blockchain computing power, comprising:

a user-side terminal interacting module, which is configured to receive a computing power purchase request sent by a user-side terminal;

a user-side terminal data processing module, which is configured to generate purchase result data according to the computing power purchase request;

a scheduling module, which is configured to schedule a first blockchain server to provide users with computing service according to the purchase result data, wherein the number of the first blockchain servers is determined according to the computing power purchased by the user, when one blockchain server is capable of meeting the computing power requirements of the user, the number of the first blockchain servers is one, otherwise, the number of the first blockchain servers is at least two;

a timing module, which is configured to, when the first blockchain server stops serving, start timing to obtain the target duration;

a judging module, which is configured to judge whether the first blockchain server restarts the service when the target duration is less than the preset duration threshold, and obtain a preset result;

a computing power compensating module, which is configured to, when the preset result is YES, improve the computing power of the first blockchain server correspondingly, so that the total service duration of the user and the actually obtained total computing power remain unchanged;

a computing power drifting module, which is configured to, when the preset result is NO, schedule a second blockchain server to provide users with computing service, wherein the number of the second blockchain servers is the same as that of the first blockchain servers.

8. The system for supplying blockchain computing power according to claim 7, further comprising: a user-side terminal;

wherein the user-side terminal is configured to send the computing power purchase request to the user-side terminal interacting module.

* * * * *